Figure 7:
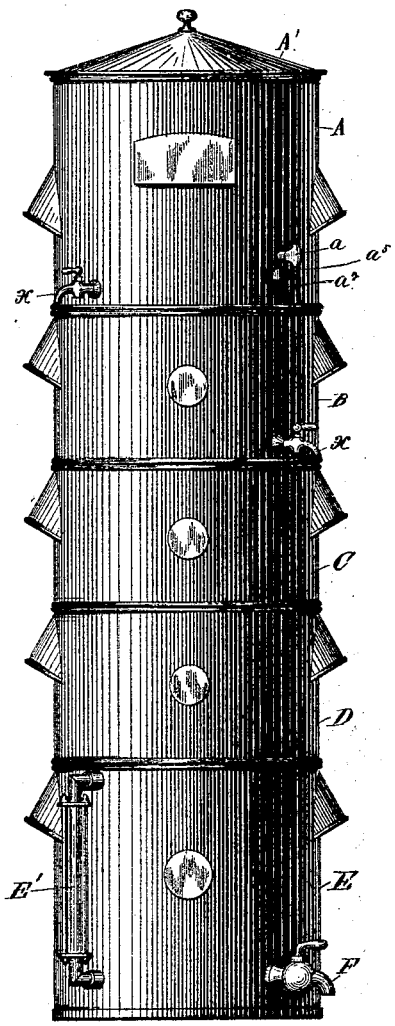

(No Model.) 2 Sheets—Sheet 1.
C. G. BRYANT.
OIL FILTER.
No. 421,093. Patented Feb. 11, 1890.
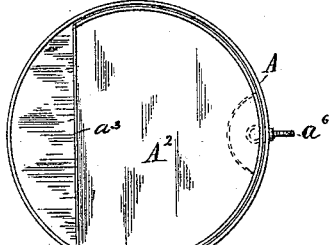

(No Model.) 2 Sheets—Sheet 2.

C. G. BRYANT.
OIL FILTER.

No. 421,093. Patented Feb. 11, 1890.

Witnesses
A. H. Opsahl.
Frank D. Merchant.

Inventor
Charles G. Bryant,
by Jas. F. Williamson
attorney

UNITED STATES PATENT OFFICE.

CHARLES G. BRYANT, OF MINNEAPOLIS, MINNESOTA.

OIL-FILTER.

SPECIFICATION forming part of Letters Patent No. 421,093, dated February 11, 1890.

Application filed August 19, 1889. Serial No. 321,222. (No model.)

*To all whom it may concern:*

Be it known that I, CHARLES G. BRYANT, a citizen of the United States, residing at Minneapolis, in the county of Hennepin and State of Minnesota, have invented a certain new and useful Improvement in Oil-Filters, of which the following is a specification, reference being had to the accompanying drawings.

Hitherto oil and similar liquids have been cleansed and purified by passing the same vertically, either upward or downward, through filtering mediums of various kinds. Of necessity the eliminated matter would rapidly collect on the filtering mediums, quickly clogging the same so as to prevent the passage of the liquid, necessitating the frequent change or cleaning of the filtering medium, together with a considerable loss of the oil or liquid absorbed therein.

The object of my invention is to overcome these defects and provide a filtering apparatus which will do the work well for a considerable period without any change in the filtering mediums, and which at the same time will be simple in construction and economical in cost.

To this end I provide an apparatus with a series of settling-chambers and filtering-diaphragms arranged vertically in the path of the liquid in its flow from one settling-chamber to another, whereby the oil is made to pass horizontally instead of vertically through the filtering-diaphragms.

I preferably use a series of settling-chambers arranged at different levels and several different filtering-diaphragms of different grades. The coarser foreign material is removed in the upper chambers, either by gravity in the settling-pockets or by lodgment on one side of coarse pervious material forming the filtering-diaphragms therein. The finer material is caught by pockets of sawdust, wool, or similar absorbents placed in the lower settling-chambers. The purified oil then finally falls into a receiver, from whence it may be drawn for use at will.

One of the distinctive features of my apparatus is the vertical arrangement of the filtering-diaphragms, thus forcing the oil therethrough horizontally instead of vertically, as hitherto. By this arrangement the oil first passes freely through the lower part of the diaphragms, and when the lower sections become clogged it simply rises to a higher level in the compartments and passes through the clean portions of the diaphragm, and so on at successive levels until the top is reached. By passing the liquid horizontally instead of vertically through the filtering mediums the sediment or other foreign material is not forced into the diaphragms by impact or gravity, as when they are arranged horizontally, but falls freely therefrom to the bottom of the settling-chamber; hence the filtering-diaphragms will last for a long time without cleansing or substitution.

Figure 8:
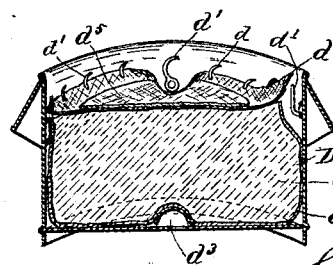

In the drawings I have shown the preferred form of my invention, wherein, like letters referring to like parts, Figure 1 is a vertical section of the entire apparatus, and Fig. 2 is a plan view of the top section thereof with the cover removed. Figs. 3, 4, and 5 are plan views of intermediate sections. Fig. 6 is a plan view of the bottom section. Fig. 7 is a view in elevation of the complete apparatus, and Fig. 8 is a detail view hereinafter referred to.

A represents the receiving and uppermost settling-compartment, having a removable cover A'.

$A^2$ is a pan or tray, either permanently or removably secured in compartment A. I preferably provide said compartment with a transverse strip or bar $a$ at a point some distance above the bottom and with lugs $a'$, upon which the pan may be seated. I also secure to the pan by solder or otherwise a depending strip $a^2$, which by passing down upon one side of bar $a$ aids in holding the pan in position. Tray or receptacle $A^2$ is not of a true circular shape. A section of the circle is removed, and secured to this side of the tray is a vertical filtering diaphragm or strainer $a^3$. Secured to the inner portion of the wall of compartment A is a pipe or passage $a^4$, which extends downward for a considerable distance for a purpose hereinafter set forth. Depending from the top of this pipe or passage $a^4$, which is located considerably above the bottom of the compartment, is a short tube $a^5$, containing a cock or valve $a^6$, and opposite the delivery end of this tube a slot or sight-opening $a^7$ is formed in the wall of the compartment. By means of this sight-opening the condition of the liquid passing from the upper compartment can be observed as it falls from the pipe $a^5$. Immediately below the compartment A is a second compartment B, which serves as a settling-compartment and contains no straining or filtering diaphragms. This compartment is divided into two independent communicating sections or pockets $b$ $b'$ by a transverse partition $b^2$, communication between the sections being established by a passage $b^3$, open at its upper and lower ends and extending nearly the width of the partition.

The delivery end of pipe or passage $a^4$, depending from compartment A, is located a short distance above the bottom of compartment B, so that liquid is delivered into the settling-compartment without much force or impact against the bottom thereof. A delivery pipe or passage $b^4$ is located in section $b'$.

C is a third compartment of the apparatus, and $c$ and $c'$ are transverse vertical partitions composed of straining material, located therein. A mass of coarse absorbent filtering material $c^2$—such, for instance, as sawdust—is placed between the partitions. A discharge port or passage $c^3$ is located in the bottom of the receptacle C at one side of the partition $c'$, and extends along the under side of such bottom to about the center thereof.

D is the next lower compartment, and it is provided with filtering-cloths $d$, hung to hooks $d'$, the space between these cloths being filled with fine absorbent material $d^2$, such as wool or waste. On the bottom of this compartment is a bent strip $d^3$, having notches in its edges, through which the oil or other liquid may flow, and at one end of this strip is the outlet $d^4$. By employing this U-shaped strip with the notches, as described, the filtering material cannot enter and choke up the discharge-outlet. The hooks $d'$, secured to the wall of the compartment, afford very convenient means for attaching the filtering-cloth. Upon the top of the filtering-cloth $d$, I may place a disk of felt or analogous material $d^5$, as shown in Fig. 8.

E is the compartment for receiving the cleansed and purified oil or other liquid, which enters by passage $e$, opening just above the bottom thereof. This compartment is provided with the usual water-gage or glass E', to indicate the height of the oil therein, and with a draw-off faucet F. Compartments A and B may be provided with faucets X, Fig. 7, through which the water and heavy sediment may be drawn off.

Having thus described my invention, the operation thereof is as follows, viz: The cover A' is removed and the oil or other liquid poured into the tray $A^2$, and as it rises therein it passes horizontally through the filtering diaphragm or strainer $a^3$, which is of comparatively coarse mesh, and falls into the compartment A. In this compartment, which serves as a settling-chamber, the liquid rises until it overflows into the pipe $a^5$, and it consequently remains for a short period in said compartment, permitting the water, sediment, and heavy foreign matter to be deposited upon the bottom thereof. The passage of the liquid is controlled by cock $a^6$, and as it falls the condition thereof can be observed through the slot or sight-opening $a^7$. The liquid falling from pipe $a^5$ through passage $a^4$ enters the chamber $b$ of settling-compartment B near the bottom thereof, so as to avoid undue agitation or splashing, and rises therein until it reaches a level on a line with the top of partition $b^2$, when it enters passage $b^3$, which delivers it just above the bottom of chamber or pocket $b'$, from which it overflows into passage $b^4$, communicating with the filtering-compartment C. In this compartment B much, if not all, of the sediment is deposited. In compartment C the liquid passes horizontally through the straining-diaphragms $c$ $c'$ of relatively fine mesh and interposed filtering substance $c^2$, as shown by the arrows, and, escaping through the passage $c^3$, falls upon about the center of the upper filtering-cloth $d$ or disk of felt $d^5$, if such be employed, and passes through the filtering material $d^2$, escaping from the compartment in a clear and purified condition through the passage $d^3$ into the storage-chamber E below, from which it can be withdrawn by faucet F. In the passage of the liquid through the compartments A and B very much, if not all, of the coarse foreign material will have been eliminated, falling to the bottom of the settling-chambers and remaining there as sediment, which may be drawn off through suitable faucets X, if desired. In its passage from left to right through the straining-diaphragms and interposed coarse filtering material of compartment C nearly all the remaining foreign matter will be removed and the color of the oil partly restored, and in its final passage through compartment D any fine particles or impurities still remaining in suspension will be deposited, leaving the oil in a clean and pure condition, ready for immediate use.

It is of course obvious that the number of compartments may be varied at will in accordance with the capacity desired, and that the shape of the compartments is a matter of no moment.

I prefer compartments of circular form, as shown in the drawings; but they could be of other well-known forms without departing from my invention.

No claim is made to the method of separating impurities from oil, as this forms the subject-matter of an application filed by me November 19, 1888, Serial No. 291,182.

Having thus described my invention, what I claim, and desire to secure by Letters Patent, is—

1. A receiving and settling compartment of a filter, having a transverse strip and side lugs located some distance above the bottom, in combination with a tray seated upon said parts and provided with a vertical diaphragm of straining material and below said diaphragm with a depending strip which fits upon one side of the transverse strip, substantially as set forth.

2. In combination with the receiving-compartment of a filter, containing a vertical diaphragm of straining material and having a sight-opening in its wall, an outlet pipe or passage, a short tube depending from the top thereof, its end terminating opposite said sight-opening, and a valve in said tube, substantially as set forth.

3. In a filtering apparatus, the combination of the compartment A, tray $A^2$, having a vertical filtering-diaphragm in said compartment, pipe or passage $a^4$, having depending valved tube $a^5$, settling-compartment B, divided into separate chambers and containing outflow-pipes starting from above the bottoms of the respective chambers, compartments C, having vertically-arranged filtering-diaphragms $c\ c'$, with interposed filtering material $c^2$ and outlet-passage $c^3$, compartment D, containing straining-cloths and fine absorbent material and provided with an outlet-passage having notched side walls, and storage-chamber E, substantially as described.

CHARLES G. BRYANT.

In presence of—
  JAS. F. WILLIAMSON,
  WM. H. BLODGETT.